United States Patent
Chang et al.

(10) Patent No.: US 8,131,094 B2
(45) Date of Patent: Mar. 6, 2012

(54) METHOD AND APPARATUS FOR ENCODING/DECODING 3D MESH INFORMATION

(75) Inventors: Eun Young Chang, Jeollabuk-do (KR); Nam Ho Hur, Daejeon (KR); Soo In Lee, Daejeon (KR); Euee Seon Jang, Seoul (KR); Dai Yong Kim, Seoul (KR); Byeong Wook Min, Seoul (KR); Sun Young Lee, Seoul (KR)

(73) Assignees: Electronics and Telecommunications Research Institute, Daejeon (KR); Industry-University Cooperation Foundation, Hanyang University, Seoul (KR)

( * ) Notice: Subject to any disclaimer, the term of this patent is extended or adjusted under 35 U.S.C. 154(b) by 1092 days.

(21) Appl. No.: 11/909,209

(22) PCT Filed: Apr. 13, 2006

(86) PCT No.: PCT/KR2006/001363
§ 371 (c)(1),
(2), (4) Date: Sep. 20, 2007

(87) PCT Pub. No.: WO2006/110002
PCT Pub. Date: Oct. 19, 2006

(65) Prior Publication Data
US 2009/0263029 A1    Oct. 22, 2009

(30) Foreign Application Priority Data

Apr. 13, 2005 (KR) .......... 10-2005-0030853
Oct. 12, 2005 (KR) .......... 10-2005-0096261
Apr. 5, 2006 (KR) .......... 10-2006-0031078

(51) Int. Cl.
*G06K 9/36* (2006.01)
*G06K 9/46* (2006.01)
*G06T 17/00* (2006.01)

(52) U.S. Cl. .................. 382/233; 345/420

(58) Field of Classification Search .............. 382/232, 382/233; 345/420, 423
See application file for complete search history.

(56) References Cited

U.S. PATENT DOCUMENTS
5,825,369 A * 10/1998 Rossignac et al. .......... 345/440
(Continued)

FOREIGN PATENT DOCUMENTS
JP        10-079049 A        3/1998
(Continued)

OTHER PUBLICATIONS

Daiyong Kim, et al; "Technical issues in 3D mesh compression", Internatinoal Organisation For Standardisation Organisation Internationale De Normalisation ISP/IEC/JTC1/SC29/WG11 Coding of Moving Picture and Audio, ISO/IEC JTC1/SC/29/WG11 MPEG2005/M11623 Hoing Kong, Jan. 2005, 4 pages.

Gabriel Taubin, et al; "Geometric Compression through Topological Surgery", International Organisation For Standardisation Organisation Internationale De Normalisation ISO/IEC JTC1/SC29/WG11 Coding of Moving Pictures and Audio, ISO/IEC JTC1/SC29/WG11 MPEG97/M3059 Feb. 1997/San Jose, 16 pages.

(Continued)

*Primary Examiner* — Yubin Hung
(74) *Attorney, Agent, or Firm* — Ladas & Parry LLP

(57) ABSTRACT

A method and apparatus for encoding and decoding three-dimensional mesh information are provided. The method and apparatus separately encode/decode order information of elements, such as vertices and faces, of a three-dimensional mesh model (original model) in consideration of a change in an element order during encoding three-dimensional mesh information for the original model. The method for encoding three-dimensional mesh information includes the steps of: encoding the three-dimensional mesh information and outputting an encoded bit-stream; calculating order information of at least one element in an original model contained in the three-dimensional mesh information; encoding the element order information; and generating packets of the encoded bit-stream, wherein the encoded element order information is inserted into the packet.

20 Claims, 8 Drawing Sheets

U.S. PATENT DOCUMENTS

| | | | |
|---|---|---|---|
| 6,438,266 B1* | 8/2002 | Bajaj et al. | 382/243 |
| 6,718,290 B1* | 4/2004 | Szymczak et al. | 703/2 |
| 6,850,638 B1* | 2/2005 | Lounsbery | 382/154 |
| 6,919,826 B1* | 7/2005 | Peacock | 341/51 |
| 8,000,540 B2* | 8/2011 | Ahn et al. | 382/232 |
| 2001/0028744 A1* | 10/2001 | Han et al. | 382/232 |
| 2003/0039396 A1* | 2/2003 | Irvine et al. | 382/233 |
| 2004/0131269 A1* | 7/2004 | Kobayashi et al. | 382/239 |

FOREIGN PATENT DOCUMENTS

| | | |
|---|---|---|
| JP | 2002-112149 A | 4/2002 |
| JP | 2003-050830 | 2/2003 |
| JP | 2004-171045 | 6/2004 |
| KR | 1020000016837 | 3/2000 |
| KR | 1020000034861 | 6/2000 |
| KR | 1020030087389 | 11/2003 |
| KR | 1020040049259 | 6/2004 |
| WO | 98/41023 A1 | 9/1998 |
| WO | 03/007246 A1 | 1/2003 |

OTHER PUBLICATIONS

Eun-Young Chang, et al; "3DMC extension for efficient animation support", International Organisation For Standardisation Organisation Internationale De Normalisation ISO/IEC JTC1/SC29/WG11 Coding of Moving Pictures and Audio ISO/IEC JTC1/SC29/WG11 MPEG2005/M11938 Apr. 2005, Busan, KR, 12 pages.

Eun-Young Chang, et al; "CE results on 3DMC revision for AFX amd.2", International Organisation For Standardisation Organisation Internationale De Normalisation ISO/IEC JTC1/SC29/WG11 Coding of Moving Pictures and Audio ISO/IEC JTC1/SC29/WG11 MPEG2005/M12553 Nice, France Oct. 2005, 14 pages.

Euee S. Jang; "3D Animation Coding: its History and Framework", 2000 IEEE International Conference on Multimedia and Expo, 2000. ICME 2000; vol. 2, pp. 1119-1122; New York, NY; ISBN: 0-7803-6536-4; Date of Current Version: Aug. 6, 2002.

* cited by examiner

[Figure 1]   (PRIOR ART)
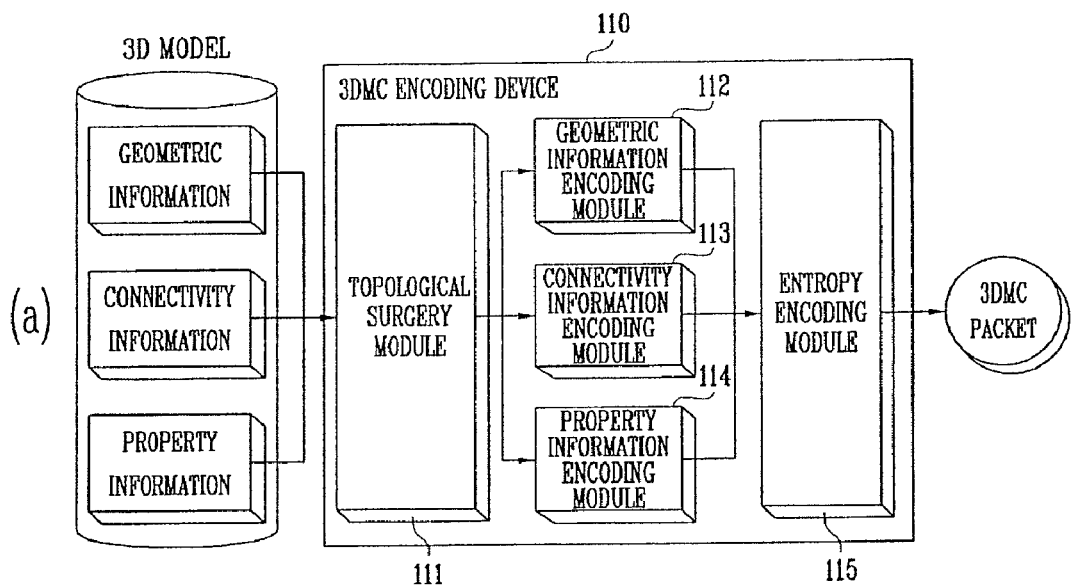
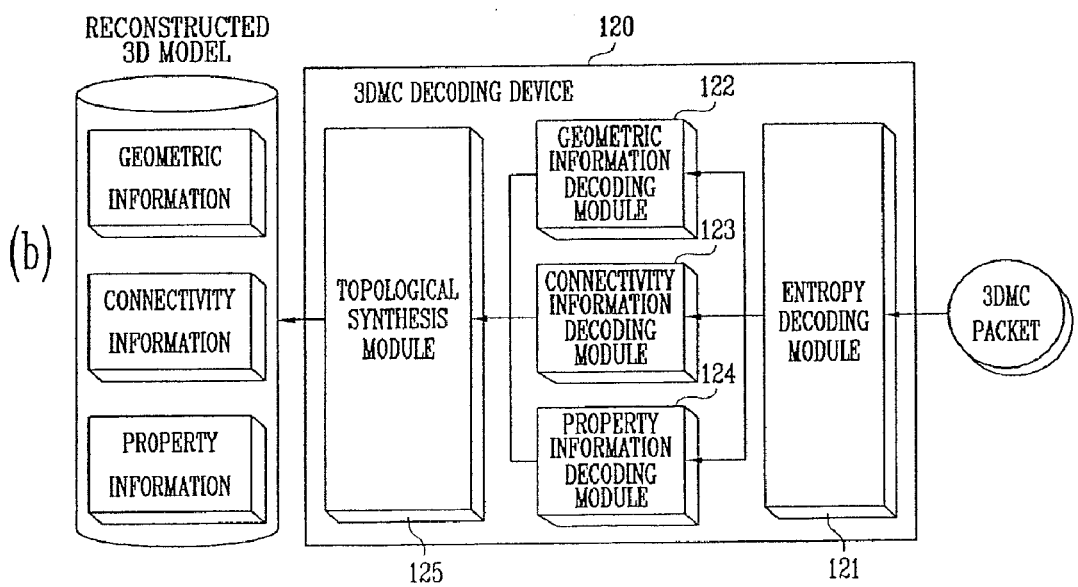

[Figure 2]
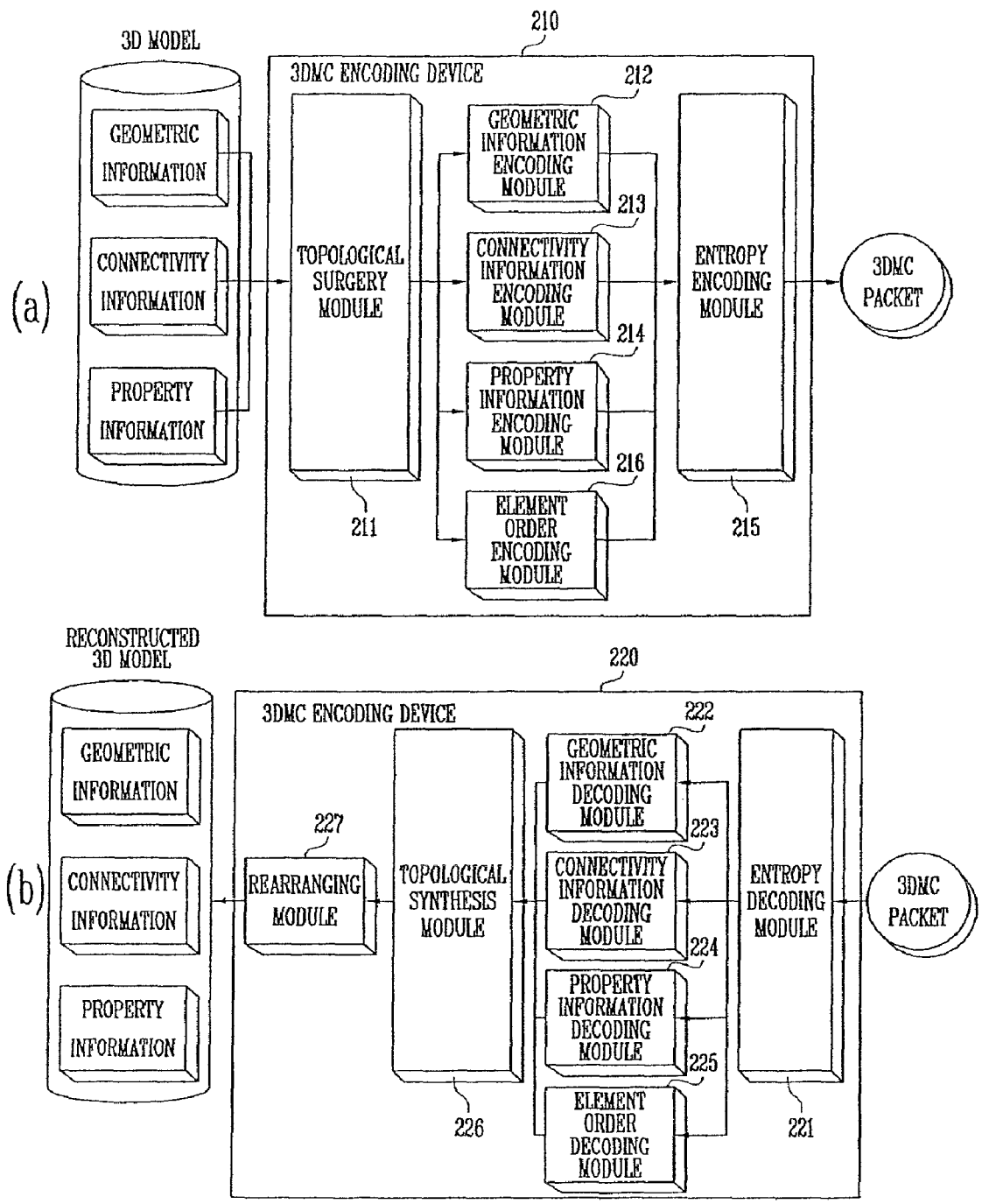

[Figure 3]
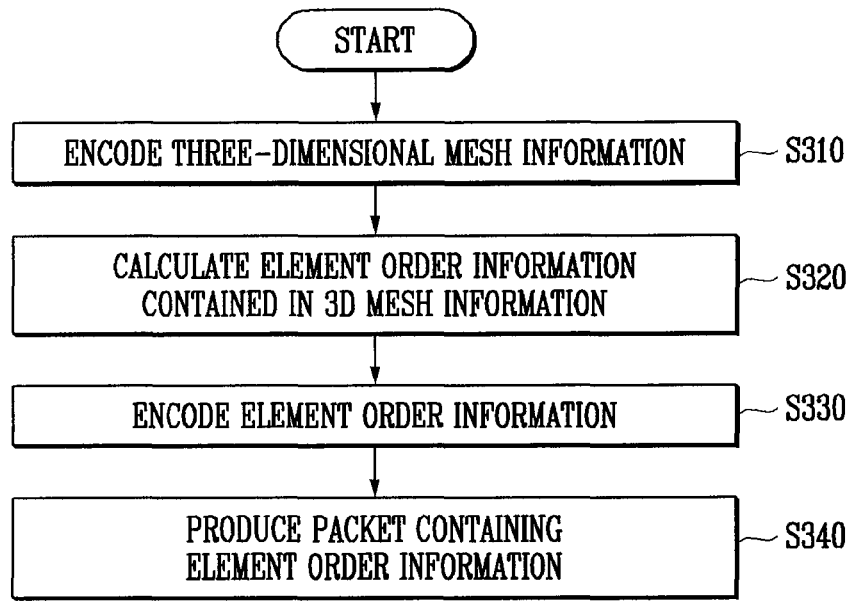
[Figure 4]
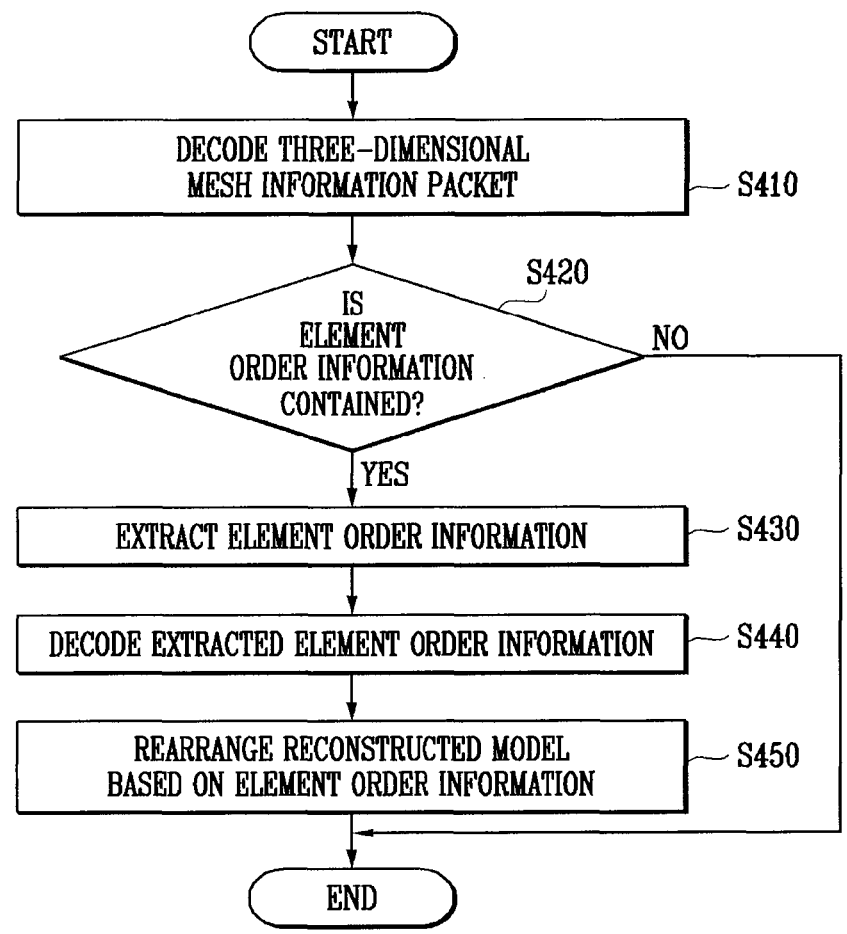

[Figure 5]
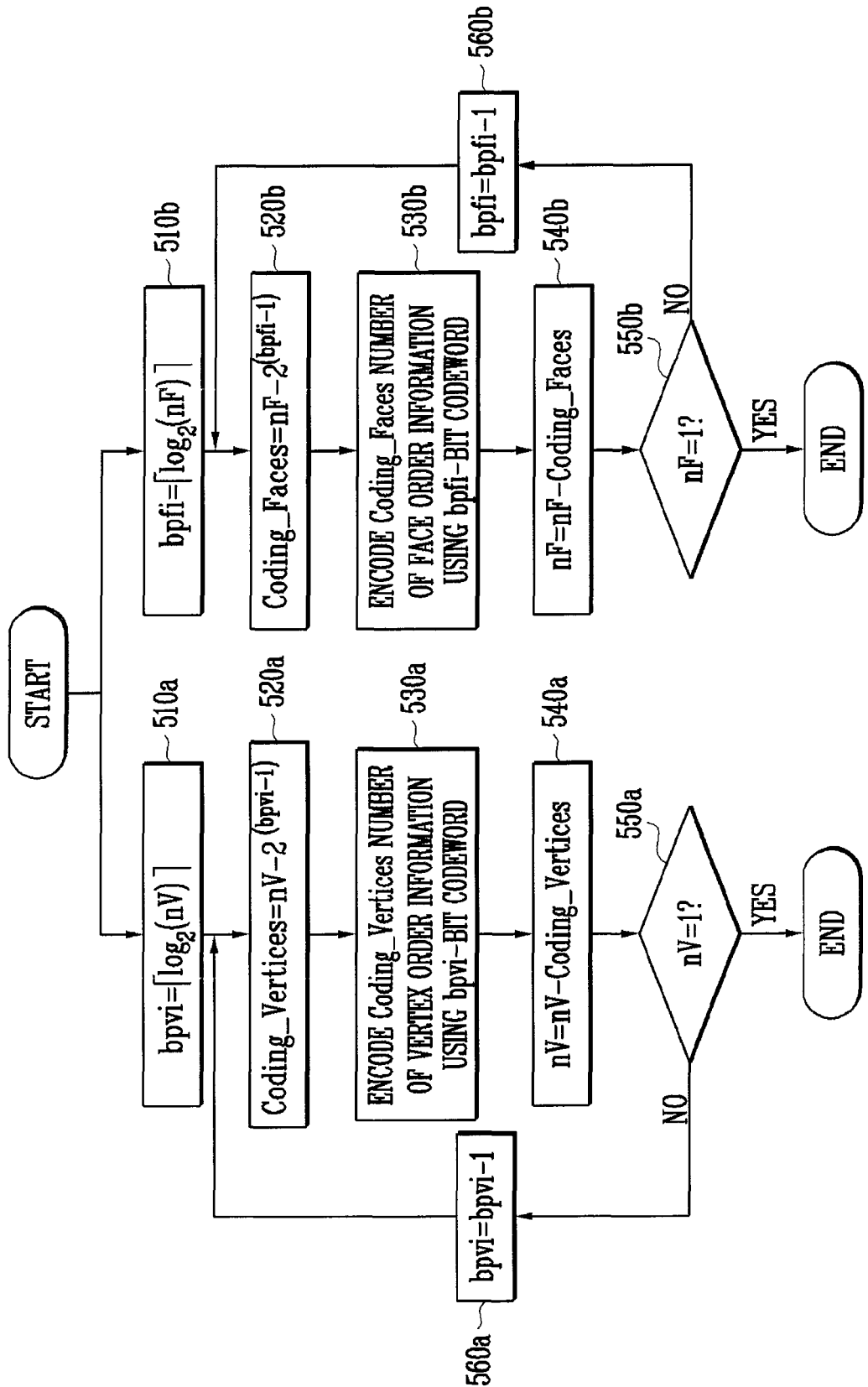

【Figure 6】
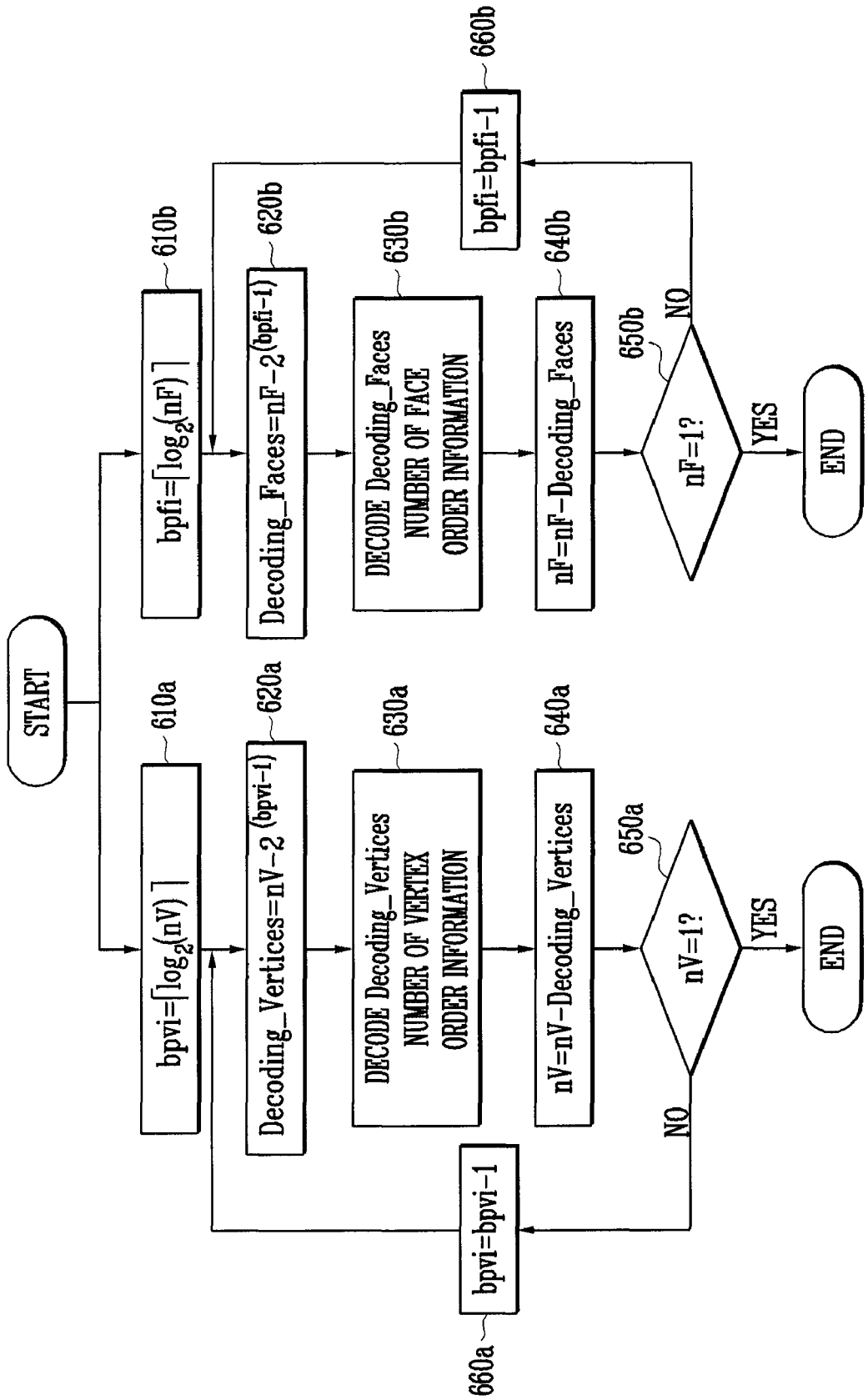

[Figure 7]
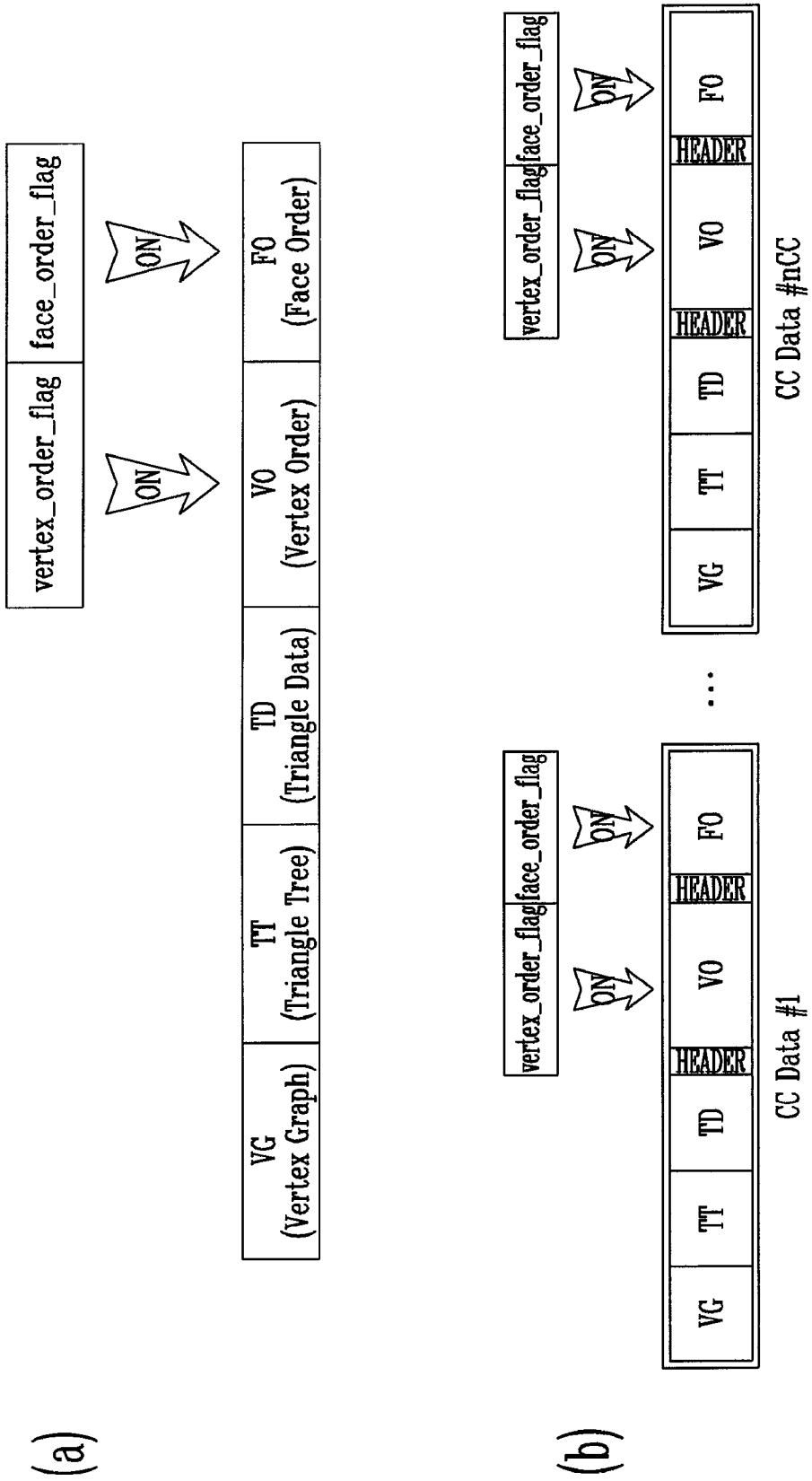

[Figure 8]
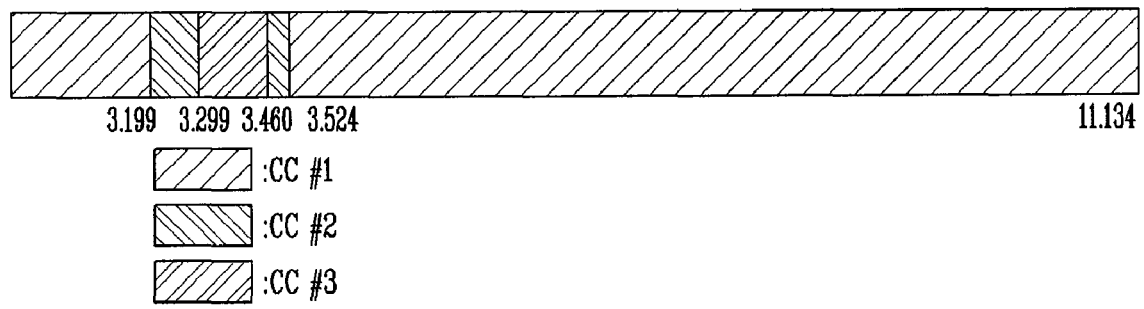

METHOD AND APPARATUS FOR ENCODING/DECODING 3D MESH INFORMATION

TECHNICAL FIELD

The present invention relates to encoding/decoding three-dimensional mesh information, and more particularly, to a method and apparatus for separately encoding/decoding order information of elements, such as vertices and faces, of a three-dimensional mesh model (original model) in consideration of a change in an element order during encoding three-dimensional mesh information for the original model.

BACKGROUND ART

Recent years have seen the beginning of widespread use of three-dimensional graphics. However, applications of these complex graphics are still limited because of the enormous amounts of information required for their implementation. Three-dimensional mesh information representing a three-dimensional model includes geometric information, inter-vertex connectivity information, and property information, such as color, normal, and texture coordinates. The geometric information includes information about three coordinates of a floating point. The connectivity information is represented by an index list in which three or more vertices form one polygon. For example, if a 32 bit floating point is used to represent the geometric information, 96 bits (12 B) are needed to represent single geometric information. That is, a 120 KB memory is required when a three-dimensional mesh model is represented by approximately ten thousand vertices having only the geometric information. A 1.2 MB memory is required when the model is represented by a hundred thousand vertices. Further, since the connectivity information can be overlapped twice or more, a massive memory is required to store a three-dimensional model using a polygonal mesh.

Encoding is needed to solve the problem of the huge amount of information. To this end, a three-dimensional mesh coding (3DMC) scheme adopted as a standard of ISO/IEC (International Organization for Standardization/International Electrotechnical Commission) in the field of MPEG-4 (Moving Picture Expert Group)-SNHC (Synthetic and Natural Hybrid Coding) improves transmission efficiency by encoding/decoding three-dimensional mesh information represented by IndexedFaceSet (IFS) in a Virtual Reality Modeling Language (VRML) file.

FIGS. 1a and 1b respectively illustrate conceptual configurations of conventional 3DMC-based encoding and decoding devices. A 3DMC encoding device 110 includes a topological surgery module 111 for decomposing a three-dimensional mesh model (original model) into two-dimensional mesh structures, a geometric information encoding module 112, a connectivity information encoding module 113, a property information encoding module 114, and an entropy encoding module 115 for collectively compressing encoding results from the encoding modules 112 to 114 to generate a 3DMC bit-stream.

The 3DMC decoding device 120 includes an entropy decoding module 121, a geometric information decoding module 122, a connectivity information decoding module 123, a property information decoding module 124, and a topological synthesis module 125, in order to reconstruct three-dimensional model data from the encoded 3DMC bit-stream.

The 3DMC encoding performed by the above-described 3DMC encoding device 110 includes, as a primary characteristic, a topological surgery operation performed by the topological surgery module 111 to maximize a compression ratio. The topological surgery operation is proposed by IBM cooperation and is a decomposition operation in which a three-dimensional model is decomposed into two-dimensional mesh structures by cutting the model along a given cutting edge on the assumption that a given mesh is the same as a sphere in topological geometry. Such operation results in a simple polygonal graph (e.g., a triangle tree (TT) having a binary tree structure composed of a triangular strip) and a vertex graph (VG) representing a path along which the mesh is cut, as an inter-vertex linked structure.

However, the above-described topological surgery operation may change the order of elements (e.g., vertices and faces) constituting an original model. For this reason, editing cannot be performed in a unit of the elements, such as vertices or faces, and animation effects based on the element order cannot be applied.

DISCLOSURE

Technical Problem

The present invention is directed to implementation of a method and apparatus for separately encoding/decoding order information of elements in an original model during encoding/decoding three-dimensional mesh information.

The present invention is also directed to implementation of a method and apparatus for encoding element orders, capable of reducing an encoding bit rate by encoding element order information while sequentially decrementing the number of bits for the codewords in a distinguishable unit.

Technical Solution

One aspect of the present invention provides a method for encoding three-dimensional mesh information. The method includes the steps of encoding the three-dimensional mesh information and outputting an encoded bit-stream; calculating order information of at least one element in an original model contained in the three-dimensional mesh information; encoding the element order information; and generating packets of the encoded bit-stream, wherein the encoded element order information is inserted into the packets.

The element order information in the original model may be at least one of vertex order information and face order information. The element order information may be calculated in an IFS unit or a CC unit.

The step of encoding the element order information may include the steps of: (i) setting an initial value of the codeword bit number used to encode the element order information as $\lceil \log_2(N) \rceil$ (where, N is a total number of the element order information); (ii) encoding a predetermined number of element order information using the set bit number of codeword; (iii) decrementing the codeword bit number by one; (iv) encoding some of the remaining element order information which is not yet encoded using the decremented bit number of codeword; and (v) repeating steps (iii) and (iv) until all the element order information is encoded.

Another aspect of the present invention provides a method for encoding element order information. The method includes the steps of: calculating order information of at least one element in an original model contained in three-dimensional mesh information; and encoding the element order information.

Still another aspect of the present invention provides a method for decoding three-dimensional mesh information.

The method includes the steps of decoding three-dimensional mesh information packets to reconstruct original model data; determining whether order information of elements in an original model exists in a prescribed area of the packet; when it is determined that the element order information exists, extracting the element order information from the packet; decoding the extracted element order information; and rearranging the reconstructed original model data based on the decoded element order information.

Yet another aspect of the present invention provides a method for decoding element order information in three-dimensional mesh information packets. The method includes the steps of extracting element order information from a prescribed area in the packet; and decoding the extracted element order information.

Yet another aspect of the present invention provides an apparatus for encoding three-dimensional mesh information. The apparatus includes means for encoding three-dimensional mesh information to output an encoded bit-stream; means for calculating order information of at least one element in an original model contained in the three-dimensional mesh information; order information encoding means for encoding the element order information; and means for generating packets of the encoded bit-stream, wherein the element order information is inserted into the packet.

Yet another aspect of the present invention provides an apparatus for decoding three-dimensional mesh information. The apparatus includes means for decoding three-dimensional mesh information packets to reconstruct original model data; order information decoding means for decoding the element order information in the packet; and means for rearranging the reconstructed original model data based on the decoded element order information.

ADVANTAGEOUS EFFECTS

With the method and apparatus for encoding and decoding the order information of elements such as vertices or faces according to the present invention as described above, it is possible to transmit the vertex/face order information with a reduced encoding bit rate and without loss by encoding the order information with the sequentially decremented number of codeword bits allocated to the order information of each element in an original model, thereby enabling functions of animating or editing a reconstructed model to be supported.

DESCRIPTION OF DRAWINGS

FIGS. 1a and 1b respectively illustrate conceptual configurations of conventional 3DMC-based encoding and decoding devices;

FIG. 2a and 2b are schematic block diagrams illustrating a 3DMC encoding device and a 3DMC decoding device according to an exemplary embodiment of the present invention;

FIG. 3 is a flowchart illustrating a process of encoding three-dimensional mesh information according to an exemplary embodiment of the present invention;

FIG. 4 is a flowchart illustrating a process of decoding three-dimensional mesh information according to an exemplary embodiment of the present invention;

FIG. 5 is a flowchart illustrating a process of encoding element order information in an IFS (IndexedFaceSet) unit according to an exemplary embodiment of the present invention;

FIG. 6 is a flowchart illustrating a process of decoding element order information in an IFS unit according to an exemplary embodiment of the present invention;

FIGS. 7a and 7b illustrate an exemplary structure of a 3DMC packet having vertex/face order information according to the present invention;

FIG. 8 illustrates a CC structure on IFS of a horse model; and

FIGS. 9a, 9b and 9c illustrate an example of a header portion of vertex/face order information according to the present invention.

MODE FOR INVENTION

Hereinafter, an exemplary embodiment of the present invention will be described in detail. However, the present invention is not limited to the exemplary embodiment disclosed below, but can be implemented in various modified forms. Therefore, the present exemplary embodiment is provided for a complete disclosure of the invention which is fully enabling to those of ordinary skill in the art.

FIGS. 2a and 2b are schematic block diagrams illustrating a 3DMC encoding device 210 and a 3DMC decoding device 220 according to an exemplary embodiment of the present invention. Referring to FIGS. 2a and 2b, the three-dimensional mesh information encoding device 210 includes a topological surgery module 211, a geometric information encoding module 212, a connectivity information encoding module 213, a property information encoding module 214, an entropy encoding module 215, and an element order encoding module 216. That is, the encoding device 210 is characterized by the element order encoding module 216 for separately encoding element order information in a three-dimensional model, unlike the conventional 3DMC encoding device 110 shown in FIG. 1a.

Similarly, the three-dimensional mesh information decoding device 220 according to the present invention further includes an element order decoding module 225 for decoding encoded element order information, and a rearranging module 227 for rearranging reconstructed three-dimensional model data based on the decoded element order information of the original model, unlike the conventional 3DMC decoding device 120 shown in FIG. 1b.

In an exemplary embodiment, the information encoded/decoded by the element order encoding module (216 of FIG. 2a) and the element order decoding module (225 of FIG. 2b) is vertex order information. However, the present invention is not limited to the vertex order information. In another exemplary embodiment, face order information may be encoded/decoded instead of the vertex order information. In yet another exemplary embodiment, both the vertex order information and the face order information may be encoded/decoded.

While the element order rearranging module 227 is shown in the FIG. 2b as operating prior to reconstruction of the three-dimensional model, the present invention is not limited to this configuration. In another exemplary embodiment, the rearranging module 227 may perform a post-process following the three-dimensional model reconstruction.

FIG. 3 is a flowchart illustrating a process of encoding three-dimensional mesh information according to an exemplary embodiment of the present invention. Referring to FIG. 3, three-dimensional mesh information is encoded and an encoded bit-stream is outputted in step S310. According to existing SNHC 3DMC encoding, the three-dimensional mesh information is data created by decomposing a three-dimensional mesh model into two-dimensional mesh structures (using topological surgery), and in an exemplary embodiment, contains a vertex graph (VG) and a triangle tree (TT) graph having a binary tree structure. However, the present invention focuses on encoding the element order information that can be changed during an encoding process, not encoding three-dimensional mesh information itself. It will be appreciated by those skilled in the art that the present invention may be applied to any encoding schemes changing an element order, as well as the above-described SNHC 3DMC encoding scheme.

Order information (IFS unit or CC unit) of each element in the original model contained in the three-dimensional mesh information is calculated in step S320. In an exemplary embodiment, since an order of elements such as the vertices and/or faces in the original model may be changed by topological surgery in the 3DMC encoding process as described above, it is necessary to calculate the original model-based order information (IFS unit or CC unit) of each element contained in the three-dimensional mesh information. In an exemplary embodiment, among the elements constituting a three-dimensional model, order information of vertices may be calculated. In another exemplary embodiment, face order information may be calculated. In yet another exemplary embodiment, both vertex and face order information may be calculated.

In step S330, the calculated element order information is encoded. According to an exemplary embodiment, the element order information is encoded to reduce an encoding bit rate while sequentially decrementing the bit number of codewords allocated to the element order information in a distinguishable unit. This will be described later with reference to FIG. 5.

In step S340, packets for the three-dimensional mesh information bit-stream encoded in step S310 are generated. The element order information is inserted into the packet.

Steps S310 to S340 are not necessarily performed in the above-described order. It will be appreciated by those skilled in the art that, in actual implementation, the steps may be performed in changed order and/or in parallel, wherein the result of performing one step should not affect the result of performing the other step.

FIG. 4 is a flowchart illustrating a process of decoding a three-dimensional mesh information packet according to an exemplary embodiment of the present invention. The three-dimensional mesh information packets are decoded in step S410. The decoding performed here is known in the art and a detailed description thereof will be omitted herein.

In step S420, a determination is made as to whether the element order information for an original model is contained in a prescribed area (e.g., header area) of the three-dimensional mesh information packet. If the element order information is not contained, the decoding process ends.

If it is determined in step S420 that the element order information is contained in the received packets, the element order information is extracted in step S430 and the extracted element order information is decoded in step S440. In step S450, a reconstructed model is rearranged in the same order as the original model using the decoded element order information. Steps S410 to S450 are not necessarily performed in the above-described order. It will be easily appreciated by those skilled in the art that the order may be changed. For example, in another exemplary embodiment, the element order information determining step S430, the element order information extracting step S440 and the decoding step S450 may be performed prior to the 3DMC decoding step S410.

As described above, the present invention is further characterized by reducing the encoding bit rate by sequentially decrementing the bit number of codewords allocated to the element order information, such as a vertex order and a face order, in a distinguishable unit in encoding the element order information. To assist in understanding the encoding of the element order information according to the present invention, the codewords allocated upon encoding the vertex order information in an IFS unit according to the present invention are shown in Table 1.

TABLE 1

| Vertex order of reconstructed model | Vertex order of original model | Codeword |
|---|---|---|
| 0 | 0 | 000 |
| 1 | 2 | 010 |
| 2 | 1 | 00 |
| 3 | 5 | 11 |
| 4 | 4 | 1 |
| 5 | 3 | Not encoded (or 0) |

As shown from Table 1, when the total number of the vertices in the original model is 6, 3 bits are required to represent the order information of each vertex. The order information "0" and "2" are encoded with codewords "000" and "010," respectively.

Four order information, i.e., "1,", "5," "4" and "3" remain after "0" and "2" are encoded. Two bits can be used to identify the four order information. Among the remaining order information, a 2-bit codeword value allocated to the first two order information "1" and "5" may be determined by any algorithm. In this example, "00" and "11" are allocated in an ascending order. The codeword values are not necessarily allocated in the ascending order, but may be allocated using several methods including a descending order.

Next, the remaining order information after encoding "1" and "5" are "4" and "3," which can be identified by one bit. Thus, a codeword "1" is allocated to "4" in an ascending order. The last order information "3" is not substantially transmitted since it can be predicted at a receiving side. However, the last order information may be encoded with "0" and transmitted for determining whether an error occurs over a network.

While, in the example shown in Table 1, two of the six vertices are encoded into three bits, two other vertices into two bits, and one vertex (two vertices) into one bit, four of the six vertices may be encoded into three bits and two vertices into two bits in another embodiment. Others combinations may also be allowed.

FIG. 5 is a flowchart illustrating a process of encoding element order information in an IFS (IndexedFaceSet) unit according to an exemplary embodiment of the present invention. While, in FIG. 5, the process of encoding the vertex order information (steps 510a to 560a) and the process of encoding the face order information (steps 510b to 560b) are shown as being both performed, the present invention is not limited to such an exemplary embodiment as described previously. The vertex order information, the face order information, or both the vertex and face order information may be selectively encoded.

First, an initial value of the codeword bit number to be allocated (bit per vertices information: bpvi) for the vertex order information is set as $\lceil \log_2(nV) \rceil$ (where, nV denotes a total number of vertices constituting the original model) (step 510a). If the total vertex number nV is 6, the bpvi value will equal 3.

In an exemplary embodiment, the number of the vertices to be encoded with the bpvi bit number, Coding_Vertices, is calculated by Equation 1 (step 520*a*).

$$\text{Coding\_Vertices} = nV - 2^{(bpvi-1)} \quad \text{Equation 1}$$

In the above example in which the total vertex number is 6, the calculated Coding_Vertices value becomes 2. The calculated Coding_Vertices number of vertex order information is then encoded using the bpvi-bit codeword (step 530*a*). Thus, in the example, two vertex order information will be encoded using three-bit codewords.

The scheme for calculating Coding_Vertices is only illustrative, and the present invention is not limited to such a calculating scheme. Alternatively, the Coding_Vertices value may be determined as $2^{(bpvi-1)}$.

The total vertex number nV is then decremented by the encoded vertex number, Coding_Vertices (step 540*a*), and a determination is made as to whether a total number of remaining vertices, nV, is one (step 550*a*). Otherwise, the codeword bit number bpvi is decremented by one (step S560*a*) and then the above-described steps 520*a* to 560*a* are repeated to encode order information of all the vertices.

Meanwhile, in steps 510*b* to 560*b*, an nF number of face order information is encoded in the same manner as in the above-described steps of encoding the vertex order information (510*a* to 560*a*). A detailed description of steps 510*b* to 560*b* will be omitted.

Thus, according to the present invention, it is possible to reduce the encoding bit rate by encoding the vertex/face order information while sequentially decrementing the codeword bit number by one.

FIG. 6 is a flowchart illustrating a process of decoding element order information in an IFS unit according to an exemplary embodiment of the present invention.

First, the initial value of the codeword bit number, "bpvi (bit per vertices information)" allocated to the encoded vertex order information is calculated by Equation 2 (step 610*a*):

$$\text{bpvi} = \lceil \log_2(nV) \rceil \quad \text{Equation 2}$$

The number of vertices to be decoded with the bpvi-bit codeword, Decoding_Vertices, is then calculated by Equation 3 (step 620*a*):

$$\text{Decoding\_Vertices} = nV - 2^{(bpvi-1)} \quad \text{Equation 3}$$

This equation is only illustrative. In another exemplary embodiment, the information about the number of the vertices to be decoded with the bpvi-bit codeword, Decoding_Vertices, may be contained in the encoded vertex order information.

Next, the Decoding_Vertices number of bpvi-bit codewords are sequentially read from the encoded vertex order information, and the vertex order information is decoded from the codewords (step 630*a*). Then, the total vertex number nV is decremented by the decoded vertex number Decoding_Vertices, and a determination is made as to whether a remaining vertex total number nV is one (step S650*a*). Otherwise, the bit number bpvi of the codeword to be read is decremented by one (step S660*a*) and the above-described steps 620*a* to 660*a* are repeated to decode the order information of all the vertices.

Meanwhile, steps 610*b* to 660*b* decode an nF number of face order information in the same manner as in the above-described steps 610*a* to 660*a* of decoding the vertex order information, and a detailed description of steps 610*b* to 660*b* will be omitted.

The process of encoding/decoding the element order information when the element order information is calculated in the IFS unit has been described. FIG. 7*a* shows an example in which element order information is inserted per IFS.

Meanwhile, according to another exemplary embodiment of the present invention, element order information may be calculated in a connected component (CC) unit. FIG. 7*b* shows an example in which element order information is inserted per CC. When element order information is inserted per CC, "VO" and "FO" respectively include order information of the vertices and faces constituting each CC. However, a flag indicating whether the vertex order information and/or the face order information is included is not need be included per CC.

While, in the above example, one bit is allocated to the flag indicating whether the vertex order information and the face order information is included, in another example, a 2-bit "vertex_face_order_flag" flag may be used to represent the following:

TABLE 2

| vertex_face_order_flag | Meaning |
| --- | --- |
| 00 | Both vertex/face order information do not exist |
| 01 | Only face order information exists |
| 10 | Only vertex order information exists |
| 11 | Both vertex/face order information exist |

As described above, the element order information may be inserted per IFS or per CC. When the element order information is inserted per CC, an element order information value calculated in the IFS unit may be simply inserted per CC. Alternatively, the element order information value calculated in the IFS unit may be converted to an element order information value calculated in the CC unit and then inserted per CC.

For example, when a model including 900 vertices is composed of three CCs each including 300 vertices, the use of the IFS unit allows the element order information having order information values from 0 to 899 to be encoded while the use of the CC unit allows for conversion into order information values from 0 to 299 for representation. Thus, the use of the CC unit enables the element order information values to be encoded using fewer bits than use of the IFS unit. For example, in case of the model consisting of 900 vertices, it is assumed that the first CC of the model is composed of 300 vertices having order information values from 0 to 299, the second CC is composed of 300 vertices having order information values from 300 to 599, and the third CC is composed of 300 vertices having order information values from 600 to 899. For the first CC, since the order information values represented by 0 to 299 are unchanged after conversion into the CC unit, these values are encoded through the process of FIG. 5. For the second CC, the order information values in the IFS unit represented by 300 to 599 are converted to the order information values in the CC unit represented by 0 to 299. The conversion is made by simply subtracting 300 from each element order information value since, in the first CC, the 300 vertices are encoded. For the third CC, the order information having values of 600 to 899 can be converted to the order information value in the CC unit having values of 0 to 299 by subtracting 600 since the order information is encoded by 300 order information in the first CC and the second CC.

Besides, CC composition on the IFS may have several strictures. That is, there may be a model in which each CC is not sequentially connected. As one example, a CC composition of a horse model is shown in FIG. 8. Since the horse model is composed of 11,135 vertices, it has element order information from 0 to 11,134 on the IFS. The IFS is composed of three CCs, in which the first CC is composed of 10,811 vertices having values from 0 to 11,134, the second CC is composed of 162 vertices having values from 3,200 to 3,523, and the third CC is composed of 162 vertices having values from 3,299 to 3,460. These values may be represented in the CC unit so that the first CC has a value from 0 to 10,810 and the second and third CCs have values from 0 to 161. However, since the order information in this model exhibits an overlapping structure when converted into the order information value in the CC unit, simple addition or subtraction of any value provides no solution. Accordingly, this problem can be solved by introducing an offset value. The problem may be solved by providing the offset value to each element order information, by providing the offset value in the CC unit, or by providing the global CC structure information in the IFS to the header. There are several other solutions as well.

For example, the horse model allows the offset values to be provided in the CC unit by providing CC #1={0, 1, 2, ..., 3199, 3524, 3525, ..., 11134}, CC #2={3200, 3201, ..., 3298, 3461, 3462, ..., 3523} and CC #3={3299, 3300, ..., 3460}, which are CC composition information, to the header portion, which makes it possible to utilize advantages that can be obtained upon encoding in the CC unit.

The process of encoding the vertex order information represented in the CC unit is the same as the process of encoding the vertex order information represented in the IFS unit except that an initial value of the allocated codeword bit number (bit per vertices information: bpvi) of the vertex order information is set as $\lceil \log_2(nC_iV) \rceil$ (where, $nC_iV$ is a total number of vertices constituting the i-th CC). The process of encoding the nCiF number of face order information is also the same as the process of encoding the face order information represented in the IFS unit except that an initial value of the allocated codeword bit number (bit per faces information: bpfi) of the face order information is set as $\lceil \log_2(nC_iF) \rceil$ (where, $nC_iF$ is a total number of faces constituting the i-th CC).

Thus, according to the present invention, it is possible to reduce the encoding bit rate by converting the vertex/face order information represented in the IFS unit into the vertex/face order information represented in the CC unit and encoding the vertex/face order information represented in the CC unit while sequentially decrementing the codeword bit number by one.

Further, the process of decoding the vertex order information represented in the CC unit is the same as the process of decoding the vertex order information represented in the IFS unit except that an initial value of the allocated codeword bit number (bit per vertices information: bpvi) of the vertex order information is set as $\lceil \log_2(nC_iV) \rceil$ (where, $nC_iV$ is a total number of vertices constituting the i-th CC). The process of decoding an $nC_iF$ number of the face order information is the same as the process of decoding the face order information represented in the IFS unit except that an initial value of the allocated codeword bit number (bit per vertices information: bpvi) of the face order information is set as $\lceil \log_2(nC_iF) \rceil$ (where, $nC_iF$ is a total number of vertices constituting the i-th CC). However, a corresponding offset value in the header information may be added to the decoded vertex/face order information values to reconstruct the decoded vertex/face order information into the vertex/face order information represented in the IFS unit.

Figure 9:
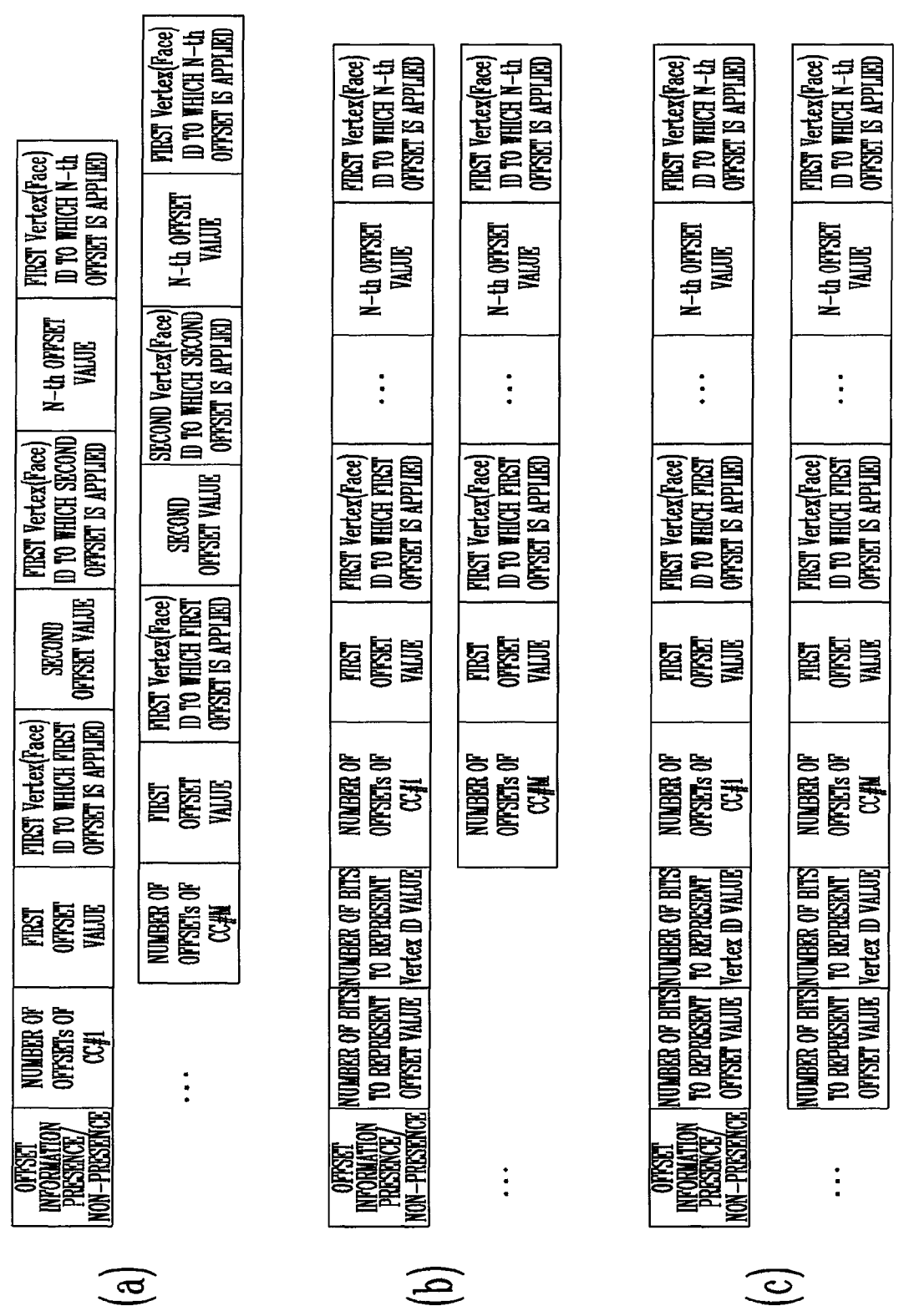

FIGS. 9a, 9b and 9c illustrate one example of the structure of a header portion indicating CC composition information on IFS according to the present invention.

Referring to FIGS. 9a, 9b and 9c, the header information includes a flag indicating whether offset information exists, the number of offsets applied to each CC when the offset information exists, a real offset value, and the first element order information (represented in the CC unit) to which each offset is applied. The shown header structure is illustrative, and representation and position of CC composition information in the header may be changed. For example, among information about the real offset values provided to the header portion, the second through last offset values, excluding the first offset value, may be set to the value of a difference with a previous offset value.

A determination as to whether to insert the element order information per IFS or CC unit may be made based on model characteristics and an encoding bit rate.

The present invention described above may be provided as a computer program stored on one or more computer-readable medium. The computer-readable medium may be a floppy disk, a hard disk, a CD ROM, a flash memory card, a PROM, a RAM, a ROM, or a magnetic tape. Generally, the computer program may be written in any programming language.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for encoding three-dimensional mesh information, comprising the steps of:
    encoding the three-dimensional mesh information and outputting an encoded bit-stream;
    calculating, in an IFS unit, element order information of at least one element in an original model contained in the three-dimensional mesh information;
    converting the element order information calculated in the IFS unit into an element order information value in a connected component (CC) unit and an associated offset value;
    encoding the element order information value in an CC unit and the associated offset value; and
    generating packets of the encoded bit-stream, wherein the encoded element order information value in an CC unit and the associated offset value is inserted into the packet.

2. The method for encoding three-dimensional mesh information according to claim 1, wherein the element order information is at least one of vertex order information and face order information.

3. The method for encoding three-dimensional mesh information according to claim 1, wherein the step of encoding the element order information comprises the steps of:
    (i) setting an initial value of a codeword bit number used to encode the element order information as $\lceil \log_2(N) \rceil$ (where, N is a total number of the element order information);
    (ii) encoding a predetermined number of element order information using the set bit number of codeword;
    (iii) decrementing the codeword bit number by one;
    (iv) encoding some of the remaining element order information which is not yet encoded using the decremented bit number of codeword; and
    (v) repeating steps (iii) and (iv) until all the element order information is encoded.

4. The method for encoding three-dimensional mesh information according to claim 1, wherein the element order information is calculated in an IFS (IndexedFaceSet) unit, and the step of encoding the element order information comprises the steps of:
(i) converting the element order information calculated in the IFS unit into element order information represented in a connected component (CC) unit and an associated offset value;
(ii) setting an initial value of a codeword bit number used to encode the element order information as $\lceil \log(C_i N) \rceil$ (where, $C_i N$ is a total number of the element order information in the i-th CC);
(iii) encoding a predetermined number of element Order information using the set bit number of codeword;
(iv) decrementing the codeword bit number by one;
(v) encoding some of the remaining element order information which is not yet encoded using the decremented bit number of codeword; and
(vi) repeating steps (iv) and (v) until all the element order information are encoded.

5. The method for encoding three-dimensional mesh information according to claim 4, further comprising the step of storing, in a header of the packet, a flag indicating that the element order information calculated in the IFS unit is converted into element order information in the CC unit.

6. The method for encoding three-dimensional mesh information according to claim 5, further comprising the step of storing the offset value in the header of the packet.

7. A method for encoding element order information, comprising the steps of:
calculating, in an IFS unit, element order information of at least one element in an original model contained in three-dimensional mesh information; and
converting the element order information calculated in the IFS unit into an element order information value in an CC unit and an associated offset value; and
encoding the element order information value in an CC unit and the associated offset value.

8. An apparatus for encoding three-dimensional mesh information, comprising:
means for encoding the three-dimensional mesh information to output an encoded bit-stream;
means for calculating in an IFS unit, element order information of at least one element in an original model contained in the three-dimensional mesh information;
means for converting the element order information value calculated in the IFS unit into an element order information value in an connected component (CC) unit and an associated offset value;
order information encoding means for encoding the element order information value in an CC unit and the associated offset value; and
means for generating packets of the encoded bit-stream, wherein the element order information value in an CC unit and the associated offset value is inserted into the packet.

9. The apparatus for encoding three-dimensional mesh information according to claim 8, further comprising means for decomposing the original model into two-dimensional structures to generate three-dimensional mesh information.

10. The apparatus for encoding three-dimensional mesh information according to claim 8, wherein the order information encoding means encodes at least one of the vertex order information and face order information of the three-dimensional mesh model.

11. A computer-readable recording medium having a computer program recorded thereon to perform the method for encoding three-dimensional mesh information according to any one of claims 2 to 6.

12. A method for decoding three-dimensional mesh information, comprising the steps of:
decoding a three-dimensional mesh information packet to reconstruct original model data;
determining whether element order information of elements in an original model exists in a prescribed area of the packet, wherein the element order information includes an element order information value in an CC unit and an associated offset value;
when it is determined that the element order information exists, extracting the element order information from the packet;
decoding the extracted element order information; and
rearranging the reconstructed original model data based on the decoded element order information.

13. The method for decoding three-dimensional mesh information according to claim 12, wherein the determination is based on a flag value indicating whether the element order information exists in a prescribed area within a header of the packet.

14. The method for decoding three-dimensional mesh information according to claim 12, wherein the step of determining whether the element order information exists comprises determining whether at least one of vertex order information and face order information exists.

15. The method for decoding three-dimensional mesh information according to claim 12, wherein the step of decoding the element order information comprises the steps of:
(i) setting an initial value of a bit number of codewords corresponding to the element order information as $\lceil \log_2(N) \rceil$ (where, N is a total number of the element order information);
(ii) reading a predetermined number of the codewords having the set bit number and reconstructing corresponding element order information from each of the read codewords;
(iii) decrementing the codeword bit number by one;
(iv) reading a predetermined number of the codewords having the decremented bit number and reconstructing corresponding element order information from each read codeword; and
(v) repeating steps (iii) and (iv) until all the element order information is reconstructed.

16. The method for decoding three-dimensional mesh information according to claim 12, wherein the step of decoding the element order information represented in a CC unit comprises the steps of:
(i) setting an initial value of a bit number of codewords corresponding to the element order information as $\lceil \log_2(C_i N) \rceil$ (where, $C_i N$ is a total number of the element order information);
(ii) reading a predetermined number of the codewords having the set bit number and reconstructing corresponding element order information from each of the read codewords;
(iii) decrementing the codeword bit number by one;
(iv) reading a predetermined number of the codewords having the decremented bit number and reconstructing corresponding element order information from each read codeword;
(v) repeating steps (iii) and (iv) until all the element order information is reconstructed; and (vi) adding a corresponding offset value stored in the packet to the reconstructed element order information to reconstruct element order information represented in an IFS unit.

17. A method for decoding element order information in a three-dimensional mesh information, comprising the steps of:

extracting element order information from a prescribed area in the three-dimensional mesh information packet, wherein the element order information includes an element order information value in an CC unit and an associated offset value; and decoding the extracted element order information.

18. A method for decoding element order information in a three-dimensional mesh information, comprising the steps of:

extracting the element order information from a prescribed area in the three-dimensional mesh information packet, wherein the element order information includes an element order information value in an CC unit and an associated offset value;

decoding the extracted element order information; and adding an offset value stored in the packet to the decoded element order information value to reconstruct the element order information represented in an IFS unit.

19. An apparatus for decoding three-dimensional mesh information, comprising:

means for decoding a three-dimensional mesh information packet to reconstruct original model data;

order information decoding means for decoding element order information in the packet, wherein the element order information includes an element order information value in an CC unit and an associated offset value; and means for rearranging the reconstructed original model data based on the decoded element order information.

20. A computer-readable recording medium having a computer program recorded thereon to perform the method for decoding three-dimensional mesh information according to any one of claims 12 to 16.

* * * * *